United States Patent [19]

Faber

[11] Patent Number: 4,660,118
[45] Date of Patent: Apr. 21, 1987

[54] DISC CASSETTE WITH SLIDABLE COVER

[75] Inventor: Johannes W. Faber, Eindhoven, Netherlands

[73] Assignee: U.S. Philips Corporation, New York, N.Y.

[21] Appl. No.: 666,025

[22] Filed: Oct. 29, 1984

[30] Foreign Application Priority Data

Aug. 27, 1984 [NL] Netherlands .................. 8402602

[51] Int. Cl.[4] .............................................. G11B 23/02
[52] U.S. Cl. .................................... 360/133; 369/291; 206/444
[58] Field of Search ............................ 360/133, 97, 99; 206/444, 303; 369/291, 289

[56] References Cited

U.S. PATENT DOCUMENTS 4,510,546  4/1985  Asami et al. ...................... 360/133

FOREIGN PATENT DOCUMENTS 0137965  4/1985  European Pat. Off. ............. 360/133
55-042311 3/1980  Japan .................................. 360/133
59-075467 4/1984  Japan .................................. 360/133

OTHER PUBLICATIONS

Hatchett, "Dual-Use Data Cartridge", IBM Technical Disclosure Bulletin, vol. 23, No. 4, Sep. 1980, pp. 1652-1653.
Godsoe et al., "Flexible Disk Data Cartidge", IBM Technical Disclosure Bulletin, vol. 21, No. 8, Jan. 1979, p. 3079.

Primary Examiner—John H. Wolff
Assistant Examiner—Matthew J. Bussan
Attorney, Agent, or Firm—F. Brice Faller

[57] ABSTRACT

A disc cassette comprising an information disc has a slot 10 for the passage of a recording and/or reproducing head and a central opening 9 for the passage of a drive spindle. On the outside it carries a closing cover which is movable towards an operational position and which has a slot 12 which aligns with the slot 10 in the envelope in the operational position of the closing cover. The closing cover 11 extends further than the central opening 9 in the major wall to cover this opening in the closing position of the closing cover and has a further opening 13 which overlaps the central opening in the envelope of the disc cassette in said operational position to allow the passage of drive spindle of a drive apparatus. Preferably the closing cover and the envelope cooperate with each other near the central opening to retain the closing cover against undesired displacements away from the enclosure.

4 Claims, 2 Drawing Figures

DISC CASSETTE WITH SLIDABLE COVER

The invention relates to a disc cassette comprising a readable information disc, an envelope in which the information disc is encased and comprising parallel opposed major walls paralleling the plane of the disc and interconnected by side walls, at least one of the major walls having a central opening for the passage of a drive spindle of a drive apparatus and a slot for the passage of information-recording and/or reproducing means of the drive apparatus, and a closing means which is movable over the outer surface of the envelope between a closing position and an operational position, which closing means has a slot corresponding to the slot in the major wall of the envelope, the two slots being aligned with each other in the operational position and the slot in the envelope being closed by the closing means in the closing position.

Such disc cassettes in which the information disc is a magnetic disc of a flexible material are known. They are employed in combination with computers for the storage of digital data. The closing means closes the slot when the disc cassette is situated outside the drive apparatus, which has the advantage that the magnetic disc cannot be damaged and is not soiled by dust or other extraneous contaminants. If instead of a magnetic disc an optically readable disc is used it has been found that the known disc cassette does not provide adequate protection for the disc because the dimensions of the information pattern recorded on the disc are much smaller than that customary with flexible magnetic discs. The invention aims at improving a disc cassette of the type defined in the opening paragraph in that it provides a more effective protection for the information disc when the disc cassette is situated outside a drive apparatus. The invention is characterized in that: the closing means extends beyond the central opening, in the major wall of the envelope; the closing means is provided with a further opening corresponding to said central opening; and said central opening and said further opening are aligned with each other in the operational position of the closing means and the closing means closes the central opening in the envelope in the closing position of said closing means. Thus, the object of the invention is accomplished by simple means, namely by using the existing closing means also for closing the central opening in the enclosure, so that in the closing position the central opening is closed and thereby precludes or at least impedes the penetration of dust or other contaminants.

A preferred embodiment of the invention is characterized in that near said central opening said major wall of the envelope and the closing means are provided with respective laps for locally retaining the closing means against a displacement away from the envelope, which laps overlap and cooperate slidably with each other. The advantage of this embodiment is that, although its dimensions are substantially larger than in the the known disc cassette, the closing means is guided effectively relative to the envelope and has no tendency to move away from the envelope.

In order that the invention may be more fully understood an embodiment of the invention will now be described in more detail, by way of example, with reference to the accompanying drawings. In the drawings.

Figure 1:
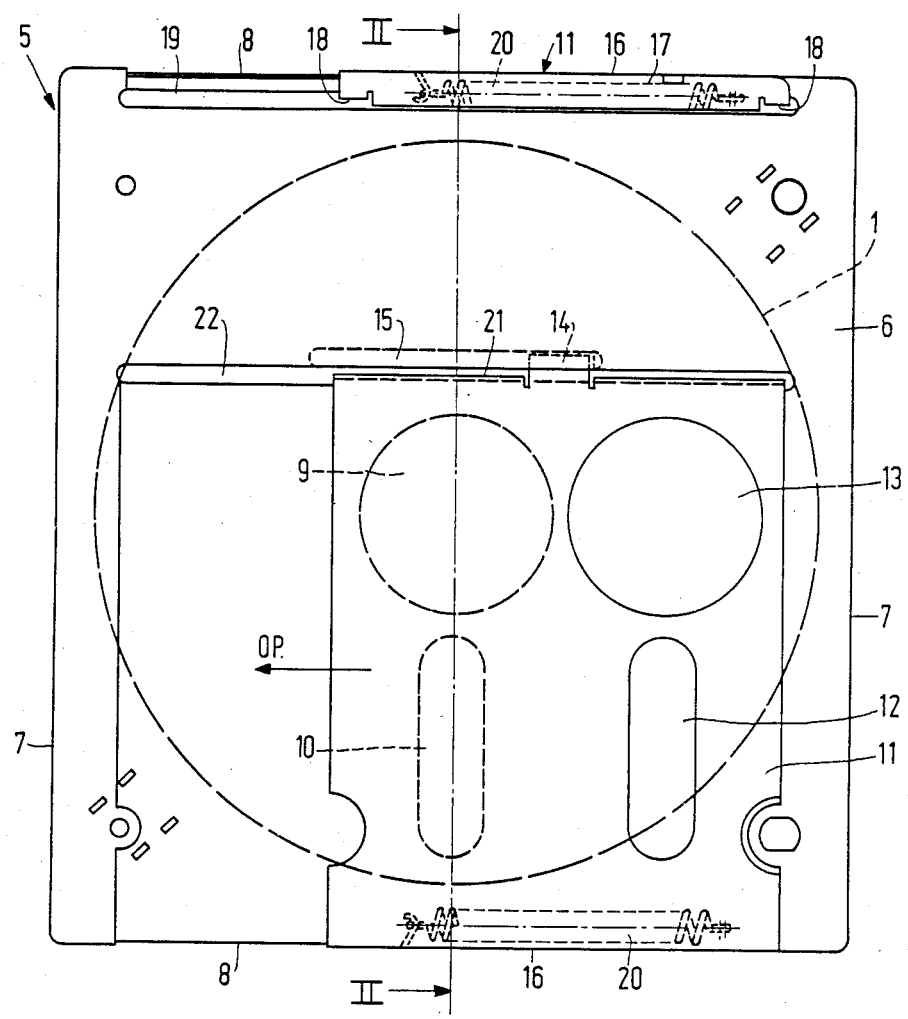
FIG. 1 is a plan view at a major wall of a disc cassette.
Figure 2:
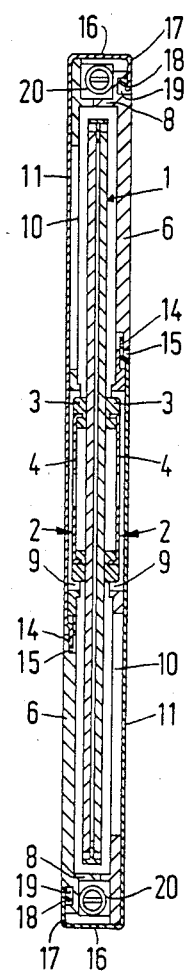
FIG. 2 is a sectional view taken on the lines II—II in FIG. 1.

The disc cassette shown in the drawings accommodates an optically readable information disc 1. The information disc itself will not be described in detail because it is irrelevant to the present invention. The information disc is of a type as described in U.S. Pat. No. 4,074,282 (herewith incorporated by reference), in particular in a version as disclosed in the Applicant's previous Netherlands Patent Application No. 84 00 476 (herewith incorporated by reference), which has not been published in due time. The information disc is readable on both sides and carries a hub 2 on both sides by means of which it can be driven by a suitable drive apparatus. Each hub comprises a plastics hub portion 3 and a metal hub portion 4 which is adapted to cooperate with a magnetic retaining device on the drive apparatus.

The information disc is encased in an envelope 5 which comprises identical parallel major walls 6 which are interconnected by two opposed side walls 7 and two opposed side walls 8. Each major wall has a central opening 9 at the location of the hub 2 for the passage of a drive spindle of a drive apparatus. Further, each major wall has a slot 10 for the passage of information-recording and/or reproducing means of the drive apparatus.

A closing means or cover 11 is arranged over the exterior of the envelope 5 on each side so as to be slidable between a closing position as shown in the drawings and an operation position, not shown. Each closing means has a slot 12 corresponding to the slot 10 in the relevant major wall of the envelope. In the operational position, not shown, of the closing means 11, in which it is shifted to the left in the plan view of FIG. 1, the two slots 10 and 12 are in register with each other and in the closing position shown the closing means closes the slot 10.

Each of two identical first and second closing means 11 extends behind the central opening 9 in a major wall 6 of the envelope and each of the closing means 11 is provided with a further opening 13 corresponding to a central opening 9. In the operational position the further opening 13 and the central opening 9 are aligned with each other and in the closing position the closing means closes the central opening 9. This provides an excellent protection for the information disc 1 against dust and environmental influences.

For a satisfactory and reliable guidance of the closing means 11, in spite of the comparatively large dimensions of this closing means, the major wall 6 and the closing means 11 are provided with respective laps 15 and 14 near the central opening 9, which laps cooperate slidably with each other. In the present embodiment the lap 14 comprises a tab which is integral with and offset from the plane of the major portion of the closing means 11. The lap 15 comprises an edge of retention slot 22 in the major wall 6, which edge is undercut and cooperates with the tab 14. The slot 22 is oriented substantially perpendicular to access slot 10. In this way the closing means is locally retained against displacements away from the envelope.

An arrow OP in FIG. 1 indicates the direction in which the closing means should be moved from the closing position shown towards the operational position. For its guidance each closing means is provided with a side wall 16 which lies adjacent side wall 8 of the envelope. The closing means is made of metal sheet, so that the required shape can be obtained readily by means of forming operations. Adjoining the side wall 16 the closing means comprises a turned-over portion 17 lying against the opposed major wall, which portion carries two further turned-over tabs 18. These tabs slide in a slot 19 in the major wall at this location. For each closing means 11 there is provided a tension spring 20 which pulls the closing means towards the closing position.

The invention is not limited to the embodiment shown in the drawings, as an example, the invention may also be used with disc cassettes which are provided with an information disc which can be read on one side only. In such a case only one closing means is required and the facing major wall may be fully closed. In the embodiment shown a thin slot is formed which communicates with the interior of the envelope at the location where the retaining tab 14 of the closing means extends beneath the edge 15 of the major wall of the enclosure. If this is undesirable, other retaining means may be employed which do not provide such a communication between the interior of the envelope and the exterior. For example, it is possible to use a guide strip which projects from the remainder of the major wall 6, in which case the latching tab 14 may be situated in the plane of the major portion of the closing means 11. Alternatively, the envelope may be provided with a tab which engages a slot in the closing means 11, for example in the turned-over portion 18, which portion engages the slot 19 in the major wall.

What is claimed is:

1. A disc cassette comprising
   a readable information disc having a central hub for receiving a drive spindle of a drive apparatus,
   an envelope in which the disc is encased, said envelope comprising a pair of opposed major walls paralleling the plane of the disc and interconnected by two pairs of opposed sidewalls, at least one of the major walls having a central opening aligned with the hub of the disc, for passage of the drive spindle, an access slot, for passage of the information recording and/or reproducing means, and a retention slot adjacent said central opening opposite said access slot, said retention slot being oriented substantially perpendicular to said access slot, said retention slot having an undercut edge,
   first closing means movable over the outside of the envelope substantially parallel to said retention slot between a closing position and an operational position, said closing means having an opening corresponding to the central opening and an access slot corresponding to the access slot in the envelope, said opening being aligned with the central opening and said access slots likewise being aligned when said closing means is in the operational position, said closing means covering the central opening and access slot in the envelope when in the closing position, said closing means being formed with a lap offset from the plane of the major portion of the closing means, said lap being overlapped by the undercut edge of the retention slot in said envelope, whereby
   said lap and said undercut edge locally retain said closing means against displacement away from the envelope, said lap and said undercut edge cooperating slidably with each other.

2. A disc cassette as in claim 1 wherein said closing means further comprises a sidewall formed substantially normally of the plane of the major portion of the closing means and facing a sidewall of the envelope which parallels the retention slot opposite the central opening, said sidewall of the closing means being formed with a turned over portion against the opposed major wall, said turned over portion being formed with tab means received in a slot in the opposed major wall, thus further retaining said closing means against displacement away from the envelope while permitting relative sliding movement.

3. A disc cassette as in claim 1 further comprising a second closing means identical to said first closing means and situated against the opposed major wall, said opposed major wall likewise having a central opening, an access slot, and a retention slot.

4. A disc cassette as in claim 2 further comprising second closing means identical to said first closing means and situated against the opposed major wall, said opposed major wall likewise having a central opening, an access slot, and a retention slot, the sidewall of said second closing means lying adjacent the sidewall of the envelope which is opposite from the sidewall of the envelope facing the sidewall of the first closing means.

* * * * *